United States Patent [19]
Soren et al.

[11] Patent Number: 5,426,825
[45] Date of Patent: Jun. 27, 1995

[54] DEVICE AND METHOD FOR FLEXIBLY ATTACHING A PAGER

[75] Inventors: Leonid Soren, Lincolnwood; Shrirang Jambhekar, Schaumburg; Albert L. Nagele, Wilmette; Joan E. Zocher, Algonquin; Michael W. Frenzer, Palatine, all of Ill.

[73] Assignee: Motorola, Inc., Schaumburg, Ill.

[21] Appl. No.: 10,732

[22] Filed: Jan. 29, 1993

[51] Int. Cl.⁶ .......................... A44B 21/00; H04B 1/08
[52] U.S. Cl. ........................................ 24/3.12; 24/490;
24/492; 24/523; 340/311.1; 340/391.1;
340/396.1; 455/351
[58] Field of Search .................. 24/3 L, 3 J, 3 R, 490,
24/492, 523, 599.2; 224/252, 253; 340/311.1,
387.1, 388.1, 391.1, 396.1; 455/348, 349, 351, 90

[56] References Cited
U.S. PATENT DOCUMENTS

| | | | |
|---|---|---|---|
| 3,956,701 | 5/1976 | James, Jr. et al. | 224/252 |
| 4,534,063 | 8/1985 | Krumin et al. | |
| 4,536,925 | 8/1985 | Boothe et al. | |
| 4,654,631 | 3/1987 | Kurcbart et al. | 24/3 L |
| 5,075,799 | 12/1991 | Pine et al. | 224/252 |
| 5,210,532 | 5/1993 | Knoedler et al. | 455/351 |

FOREIGN PATENT DOCUMENTS

| | | | |
|---|---|---|---|
| 139928 | 5/1985 | European Pat. Off. | 24/3 R |
| 187102 | 7/1992 | Japan | 24/3 R |
| 13951 | 11/1990 | WIPO | 340/311.1 |

Primary Examiner—Edward K. Look
Assistant Examiner—James A. Larson
Attorney, Agent, or Firm—Darleen J. Stockley

[57] ABSTRACT

A flexibly adjustable mounting clip assembly and method for providing the assembly for a pager includes a swivel assembly (104) for raising and rotating the mounting clip (102) approximately 180° to provide a reversibly positioned clip. The clip allows for positioning in an introverted position, i.e., facing the bent section toward the pager and for positioning in an extroverted position, i.e., facing away from the pager. In addition, a transparent portion may be positioned below the clip assembly for allowing observation of the information display of the pager.

10 Claims, 4 Drawing Sheets

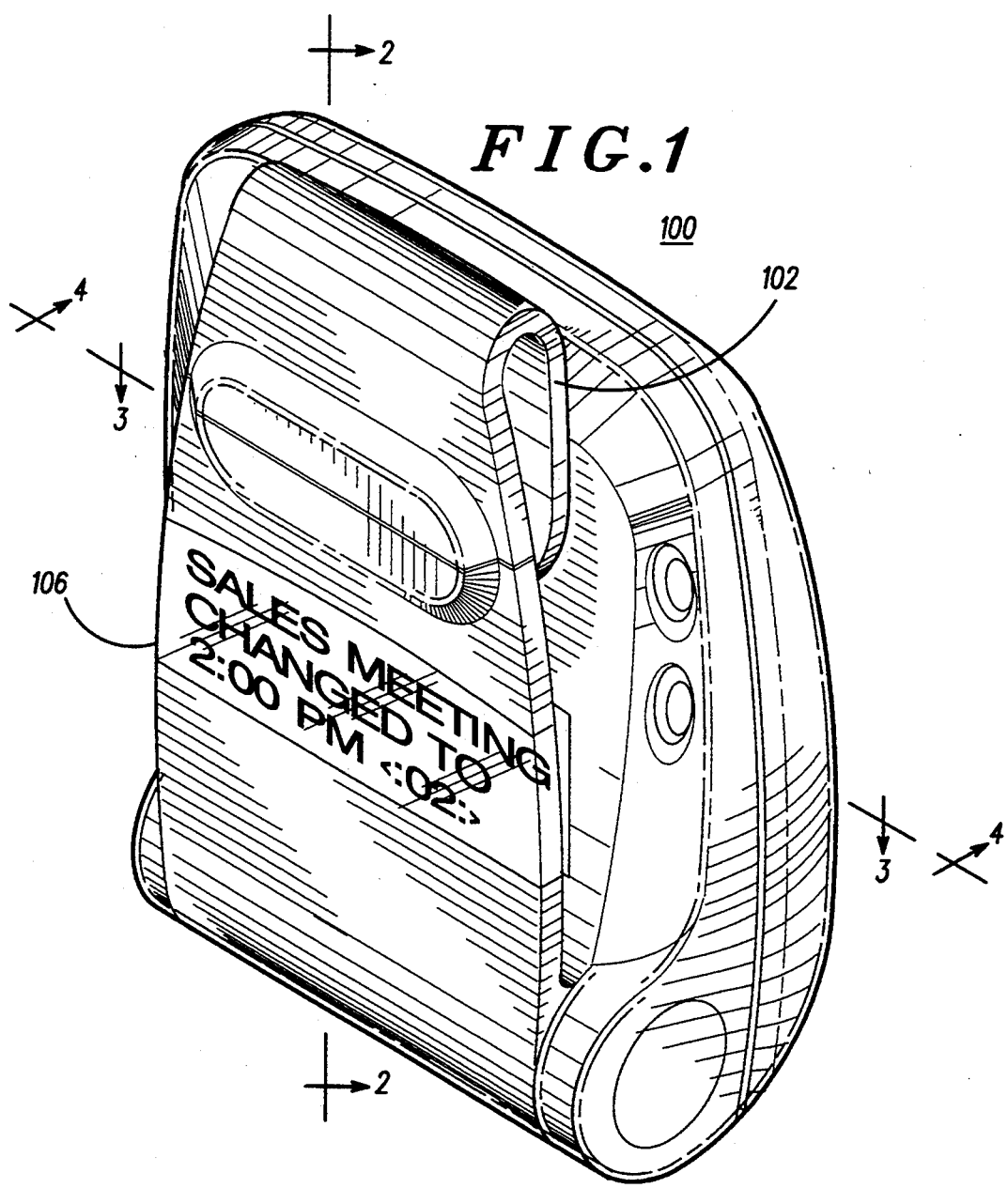

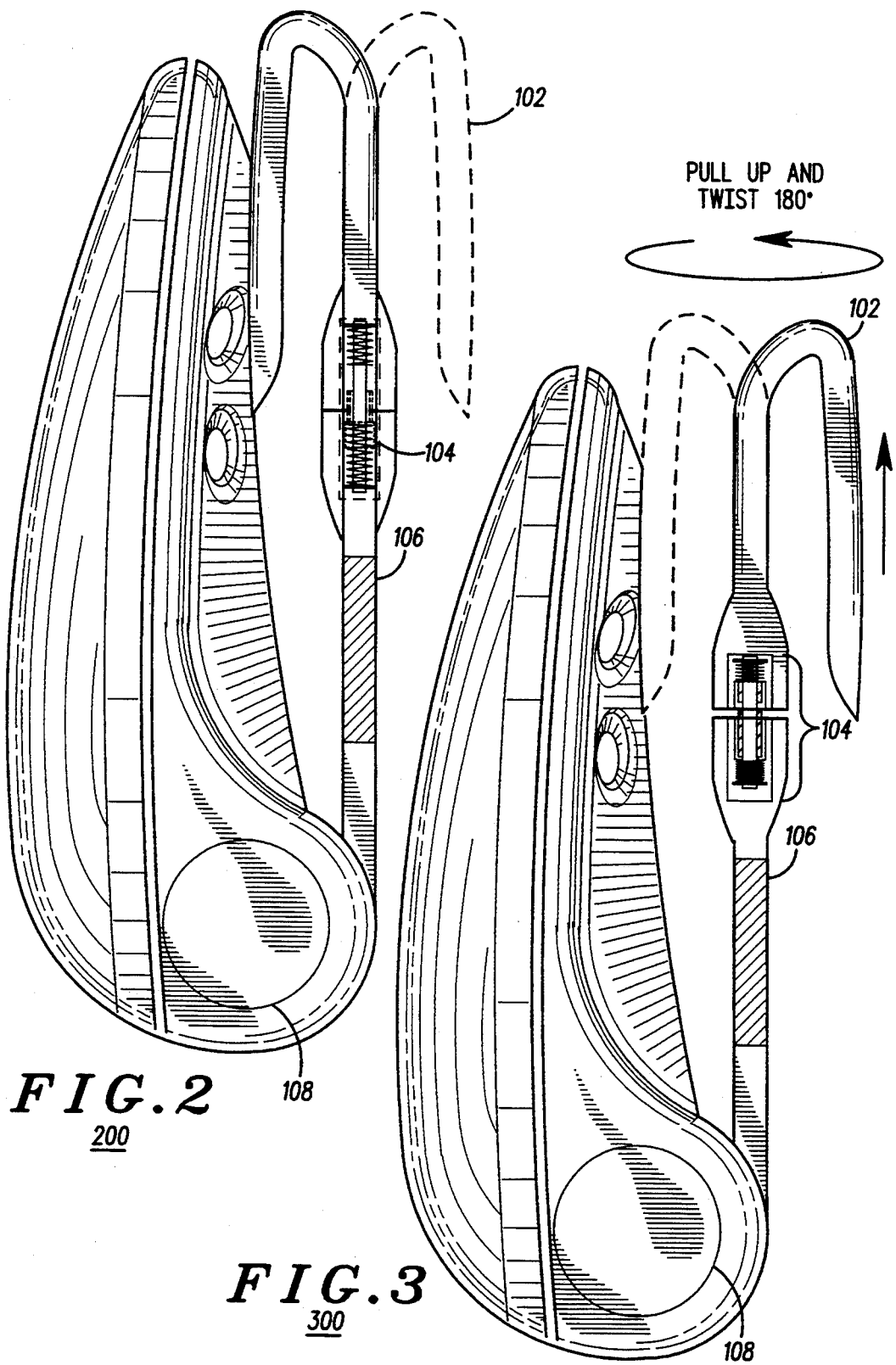

802 — PROVIDING A PAGER WITH A HOUSING MEMBER HAVING A ROTATABLE MOUNTING CLIP

804 — PROVIDING SWIVELING MEANS ATTACHED TO THE MOUNTING CLIP FOR PROVIDING, AT DIFFERENT TIMES, SECURE INTROVERTED AND EXTROVERTED POSITIONING OF THE MOUNTING CLIP WITH RESPECT TO THE PAGER

DEVICE AND METHOD FOR FLEXIBLY ATTACHING A PAGER

FIELD OF THE INVENTION

The present invention relates generally to selective call radio alerting devices, as for example, to paging receivers of the kind which can be carried on the person of a user.

BACKGROUND

Personal radio receivers (pagers) are utilized so that users may receive messages at any time, thereby being continuously available for communication with other persons. Paging devices typically include a signaling means, a battery power supply, and an antenna enclosed in a case. The case usually has a fastening means for attaching the pager to clothing worn by the user, for example, a belt.

Preferably, the pager should be detachably fastened to the clothing in a manner that facilitates easy, quick removal. For this purpose, typically a fixed clip that is suitable for hooking over a belt is attached to the pager case.

In addition, pagers have been developed that have information displays. Hence, it is important that the fastening device be attached in such a manner that the pager may be adjusted so that the information display may readily be observed when the pager is worn by the user and also when the pager is removed from the user's clothing.

Thus, there is a need for a pager that may be adaptively fastened to a user's clothing and that allows observation of an information display message both when the pager is worn and when the pager is removed from the user's clothing.

SUMMARY OF THE INVENTION

The present invention provides a mounting clip assembly for a paging receiver (pager) and a method for providing same, where the mounting clip assembly has an adjustable clip for attachment. The mounting clip assembly includes a mounting clip and swiveling means attached to the mounting clip for providing, at different times, secure introverted and extroverted positioning of the mounting clip with respect to the pager.

BRIEF DESCRIPTION OF THE DRAWINGS

FIG. 1 is a perspective view of the paging receiver illustrating the pager clip being held by the clipping assembly in the introverted position.

FIG. 2 is a partial sectional view of the left side elevation of the pager mounting clip assembly along section lines 2—2 showing the clip in the introverted position.

FIG. 3 is a partial sectional view of the left side elevation of the pager mounting clip assembly along section lines 2—2 showing the clip in the extroverted position.

DETAILED DESCRIPTION OF A PREFERRED EMBODIMENT

Figure 4:
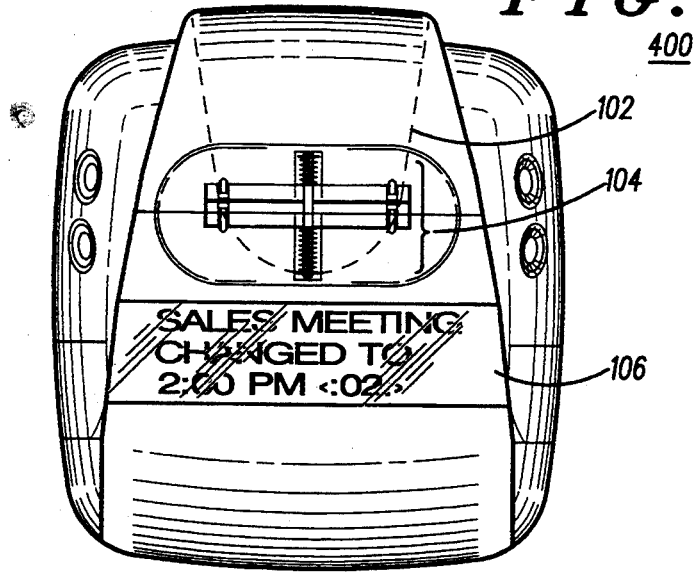
FIG. 4 is a partial sectional view of the rear plan of the pager mounting clip assembly along section lines 3—3.

The present invention provides for a novel flexibility in the attachment of a paging receiver (pager), typically to clothing of a user, by allowing the introverted clip on the receiver to be reversed to form an extroverted clip. The extroverted clip conveniently allows for the pager to be clipped to a shirt pocket, a skirt, or a belt. In addition, the clip may include a read-through transparent portion for allowing the information display to be viewed through the clip.

FIG. 1, numeral 100, is a perspective view of the paging receiver illustrating the pager mounting clip being held by the clipping assembly in the introverted position. The clip (102) is positioned toward the pager, allowing for convenient attachment to a belt. A transparent portion (106) of the clip allows for convenient viewing of the information display through the clip itself.

FIG. 2, numeral 200, is a partial sectional view of the left side elevation of the pager mounting clip assembly along section lines 2—2 showing the clip in the introverted position. This sectional view shows the two alternative positions of the clip with respect to the pager. The clip (102) may be introverted, i.e., facing the pager itself, or extroverted, i.e., facing away from the pager. The spring-loaded assembly includes a swiveling means (104) that holds the clip (102) in place and allows the clip (102) to assume alternate introverted and extroverted positions is illustrated, with a transparent portion (106) of the clip for viewing the information display being located immediately below the clipping assembly. Further, the hinging area (108) may be utilized for storing the power supply, typically a battery, for the pager.

FIG. 3, numeral 300, is a partial sectional view of the left side elevation of the pager mounting clip assembly along section lines 2—2 showing the clip in the extroverted position. This view shows with greater particularity that the spring-loaded assembly of the clip provides for raising the clipping portion, rotating 180° and returning to a seated position over a key assembly, thus providing the clip securely in the extroverted position.

FIG. 4, numeral 400, is a partial sectional view of the rear plan of the pager mounting clip assembly along section lines 3—3. Here, the spring-loaded assembly is illustrated, showing the key portion that provides for secure seating of the clip in both the introverted and extroverted positions.

Figure 5:
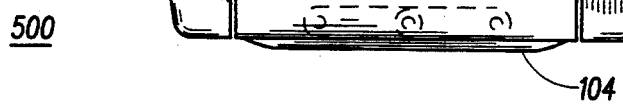
FIG. 5 is a partial sectional view of the top plan of the pager mounting clip assembly along section lines 4—4.

FIG. 5, numeral 500, is a partial sectional view of the top plan of the pager mounting clip assembly along section lines 4—4. The spring-loaded assembly including the key portion is shown in the clip.

Figure 6:
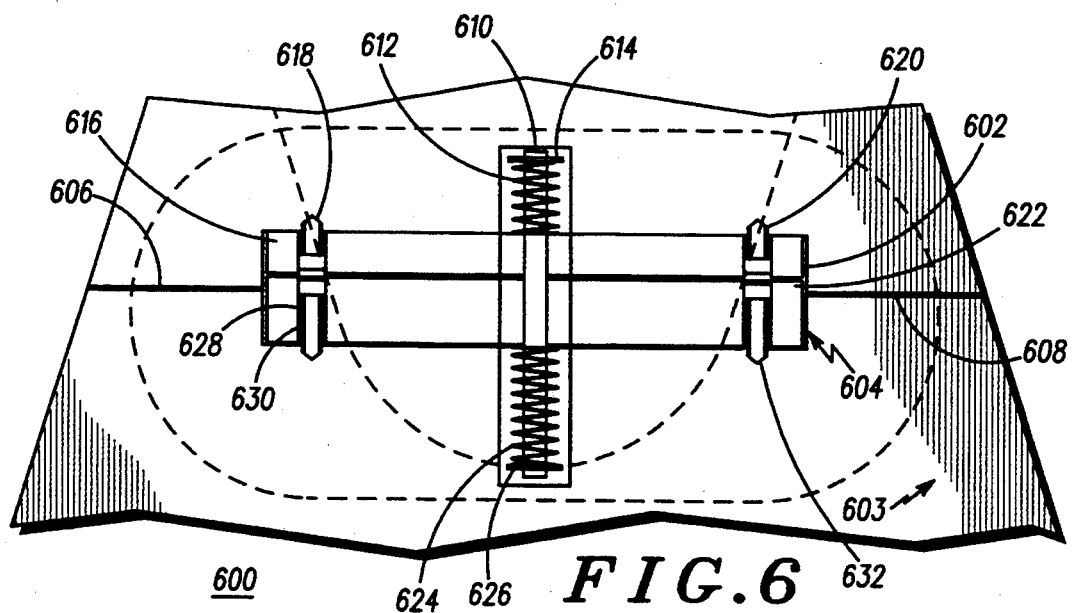
FIG. 6 is a partial sectional view of the rear plan of the pager mounting clip assembly along section lines 3—3 showing the adjustable clipping assembly with greater particularity.

FIG. 6, numeral 600, is a partial sectional view of the rear plan of the pager mounting clip assembly along section lines 3—3 showing the adjustable clipping assembly with greater particularity. The mounting clip assembly for the paging receiver (pager) has an adjustable clip for attachment, at different times, in a secure introverted and extroverted position with respect to the pager. The mounting clip assembly comprises a mounting clip (102) and a swiveling means (104) attached to the mounting clip.

Where selected, a transparent portion (106) may be attached to the lower portion of a lower housing member of swiveling means (104), described more fully below, for allowing viewing of an information display of a pager through the transparent portion. In addition, a hinging means (108) may be provided for coupling the mounting clip assembly to the pager. For further convenience, the hinging means (108), together with a pager hinging means, may be adapted to allow storage of a power supply for the pager therein.

The mounting clip assembly for the pager has an upper housing member (601) that has an upper portion bent to form a mounting clip (102) and a lower portion having an aperture (602) that extends upward vertically from a bottom edge of the upper housing member (601). The assembly includes a lower housing member (603) that has an upper portion with an aperture (604) that extends downward vertically from a top (608) of the upper portion of the lower housing member to a lower portion of the lower housing member. The upper portion of the lower housing member 603 is attached to the lower portion of the upper housing member 601 by a swiveling means (104) mounted in the aperture (604) of the upper portion (603) of the lower housing member. The lower portion of the lower housing member is constructed to allow hinged attachment to the pager.

The swiveling means (104) is constructed to provide, at different times, secure introverted and extroverted positioning of the mounting clip with respect to the pager. The swiveling means (104) comprises a pivot pin (610), located in the aperture (602) of the lower portion of the upper housing member and in the aperture (604) of the upper portion of the lower housing member. The pivot pin (610) is attached to an upper portion of the lower portion of the upper housing member and also is attached to a lower portion of the upper portion of the lower housing member. The pivot pin passes through a first spring (612) that is biased against a first spring-retaining means (614), typically a retaining clip, located in the aperture (602) proximate to the upper portion of the lower portion of the upper housing member. The first spring (612) is also biased against a first key means (616) located proximate to the lower portion of the lower portion of the upper housing member. The pivot pin (610) further passes through the first key means (616) that is attached to the lower portion of the upper housing member by first fastening means (618, 620). Typically, the first fastening means comprises screws that are inserted through apertures formed in said first key means (616). Generally, the apertures in the upper and lower housing members are conformed to allow movement of the springs (612, 624) such that the springs allow raising and rotating the mounting clip and securely pacing the key means (616, 622) alternately in the introverted and extroverted positions with respect to the pager.

The pivot pin (610) further passes through the second spring (624) that is biased against a second spring-retaining means (626, again typically a retaining clip, located in the aperture (604) proximate to the lower portion of the upper portion of the lower housing member. The second spring (624) is further biased against a second key means (628) located proximate to the upper portion of the upper portion of the lower housing member. The pivot pin (610) further passes through the second key means (628) that is attached to the upper portion of the lower housing member by second fastening means (630, 632). Typically, the second fastening means (630, 632) comprises screws that are inserted through apertures formed in said second key means (616).

The swiveling means (104) provides for rotating the mounting clip (102) approximately 180°. That is, the clip allows for positioning in an introverted position, i.e., facing the bent section toward the pager and for positioning in an extroverted position, i.e., facing away from the pager.

Figures 7, 8:
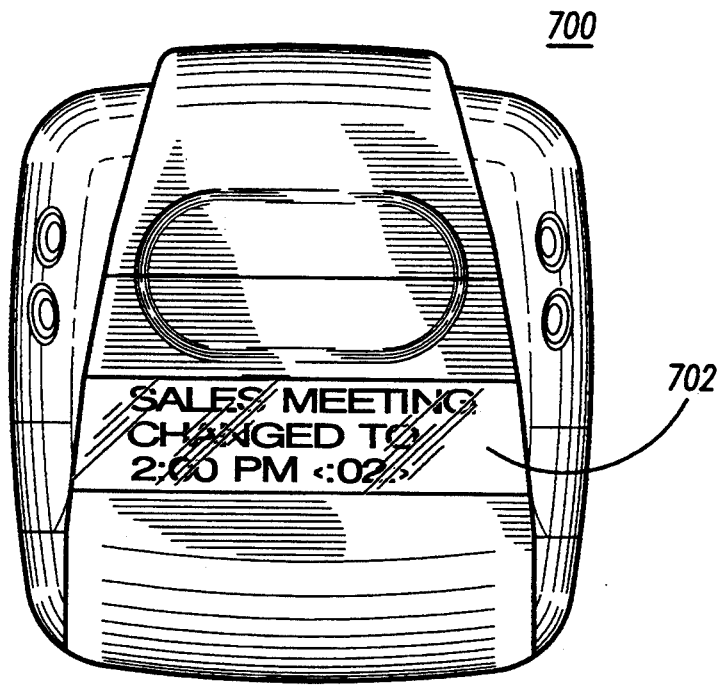
FIG. 7 is a rear plan view of the pager showing a transparent portion for viewing an information display.
FIG. 8 is a flow chart setting forth a method for providing a clip assembly for flexible attachment of a pager in accordance with the present invention.

FIG. 7, numeral 700, is a rear plan view of the pager showing a transparent portion for viewing an information display. The information display, located on the portion of the pager located between the housing member having the adjustable clip and the pager itself, is visible through the transparent section (702) of the housing member.

The present invention, illustrated in FIG. 8, numeral 800, further includes a method for providing a clip assembly for flexible attachment of a pager. The steps of the method include: (1) providing a housing member with a rotatable mounting clip (802), and (2) providing swiveling means attached to the mounting clip for providing, at different times, secure introverted and extroverted positioning of the mounting clip with respect to the pager (804).

The method may be selected to further include the step of providing a transparent portion attached to a portion for housing the swiveling means for allowing viewing of an information display of a pager through the transparent portion. In addition, where selected, the method may include the step of providing a hinging means, coupled to the housing member, for coupling the clip assembly to the pager.

Typically, the hinging means, together with a pager hinging means, is adapted to allow storage of a power supply for the pager therein, i.e., storage of the power supply within the hinge itself.

While the invention has been described with respect to a specific embodiment, it is evident that many alterations, modifications, and variations will become apparent to those skilled in the art in light of the foregoing invention. Accordingly, it is intended that the present invention embrace all such alternatives, modifications and variations as fall within the spirit and broad scope of the appended claims.

We claim:

1. A mounting clip assembly for a paging receiver having an adjustable clip for attachment, comprising:
   (A) a mounting clip, and
   (B) swiveling means attached to the mounting clip for providing, at different times, secure introverted and extroverted positioning of the mounting clip with respect to the paging receiver, further including a transparent portion attached to a portion for housing the swiveling means for allowing viewing of an information display of the paging receiver through the transparent portion.

2. A mounting clip assembly for a paging receiver having an adjustable clip for attachment comprising:
   (A) a mounting clip, and
   (B) swiveling means, attached to the mounting clip for providing, at different times, secure introverted and extroverted positioning of the mounting clip with respect to the paging receiver,
   further including a hinging means for coupling the mounting clip assembly to the paging receiver.

3. The mounting clip assembly of claim 2 wherein the hinging means, together with a paging hinging means, are adapted to allow storage of a power supply for the paging receiver within the hinging means.

4. A mounting clip assembly for a paging receiver having an adjustable cilia for attachment, comprising:

an upper housing member having an upper portion bent to form a mounting clip and a lower portion having an aperture that extends upward vertically from a bottom edge of the upper housing member, and a lower housing member having an upper portion with an aperture that extends downward vertically from a top edge of the lower housing member to a lower portion of the lower housing member, the upper portion of the lower housing member being attached to the lower portion of the upper housing member by swiveling means mounted in the aperture of the upper portion of the lower housing member and the lower portion of the lower housing member further being constructed to allow hinged attachment to the paging receiver, where the swiveling means is constructed to provide, at different times, secure introverted and extroverted positioning of the mounting clip with respect to the paging receiver.

5. The mounting clip of claim 4 wherein the hinged attachment is adapted to allow storage of a power supply for the paging receiver within the hinged attachment.

6. A mounting clip assembly for a paging receiver having an adjustable clip for attachment, comprising:

an upper housing member having an upper portion bent to form a mounting clip and a lower portion having an aperture that extends upward vertically from a bottom edge of the upper housing member, and a lower housing member having a first upper portion with an aperture that extends downward vertically from a top edge of the lower housing member to a first lower portion of the lower housing member, the first upper portion of the lower housing member being attached to the lower portion of the upper housing member by swiveling means mounted in the aperture of the first upper portion of the lower housing member and the first lower portion of the lower housing member further being constructed to allow hinged attachment to the paging receiver, where the swiveling means is constructed to provide, at different times, secure introverted and extroverted positioning of the mounting clip with respect to the paging receiver wherein the swiveling means comprises:

a pivot pin, located in the aperture of the lower portion of the upper housing member and in the aperture of the first upper portion of the lower housing member and attached to an upper portion of the lower portion of the upper housing member and also attached to a second lower portion of the first upper portion of the lower housing member, the pivot pin passing through a first spring that is biased against a first spring-retaining means located in the aperture proximate to the upper portion of the lower portion of the upper housing member and against a first key means located proximate to a lower part of the lower portion of the upper housing member, the pivot pin further passing through the first key means that is attached to the lower portion of the upper housing member by first fastening means, the pivot pin further passing through a second spring that is biased against a second spring-retaining means located in the aperture proximate to the second lower portion of the first upper portion of the lower housing member and against a second key means located proximate to an upper part of the first upper portion of the lower housing member, the pivot pin further passing through the second key means that is attached to the upper part of the lower housing member by second fastening means.

7. The mounting clip assembly of claim 6 further including a transparent portion attached between the first upper portion and the first lower portion of the lower housing member for allowing viewing of an information display of the paging receiver through the transparent portion.

8. A method for providing a clip assembly for flexible attachment of a pager, comprising the steps of:

(A) providing a housing member with a rotatable mounting clip, and (B) providing swiveling means attached to the mounting clip for providing, at different times, secure introverted and extroverted positioning of the mounting clip with respect to the pager further including the step of providing a transparent portion attached to a portion having the swiveling means mounted therein for allowing viewing of an information display of the pager through the transparent portion.

9. A method for providing a clip assembly for flexible attachment of a pager comprising the steps of:

(A) providing a housing member with a rotatable mounting clip, and (B) providing swiveling means attached to the mounting clip for providing at different times, secure introverted and extroverted positioning of the mounting clip with respect to the pager further including the step of providing a transparent portion attached to portion having the swiveling means mounted therein for allowing viewing of an information display of the pager through the transparent portion, further including the step of providing a hinging means, coupled to the housing member, for coupling the mounting clip assembly to the pager.

10. The method of claim 9 wherein the hinging means, together with a pager hinging means, are adapted to allow storage of a power supply for the pager within the hinging means.

* * * * *

UNITED STATES PATENT AND TRADEMARK OFFICE
CERTIFICATE OF CORRECTION

PATENT NO. : 5,426,825
DATED : June 7, 1995
INVENTOR(S) : Soren, et al.

It is certified that error appears in the above-indentified patent and that said Letters Patent is hereby corrected as shown below:

Claim 2, Column 4, Line 59, after attachment insert --,--.

Claim 4, Column 5, Line 4, delete "cilia" and insert --clip--.

Claim 9, Column 6, Line 41, after pager insert --,--.

Claim 9, Column 6, Line 49, after to insert -- a --.

Signed and Sealed this

Twenty-eighth Day of May, 1996

Attest:

BRUCE LEHMAN

*Attesting Officer*   *Commissioner of Patents and Trademarks*